March 26, 1935.  H. E. K. POHL  1,996,026
BOILER FEED TRAP
Filed Oct. 31, 1930
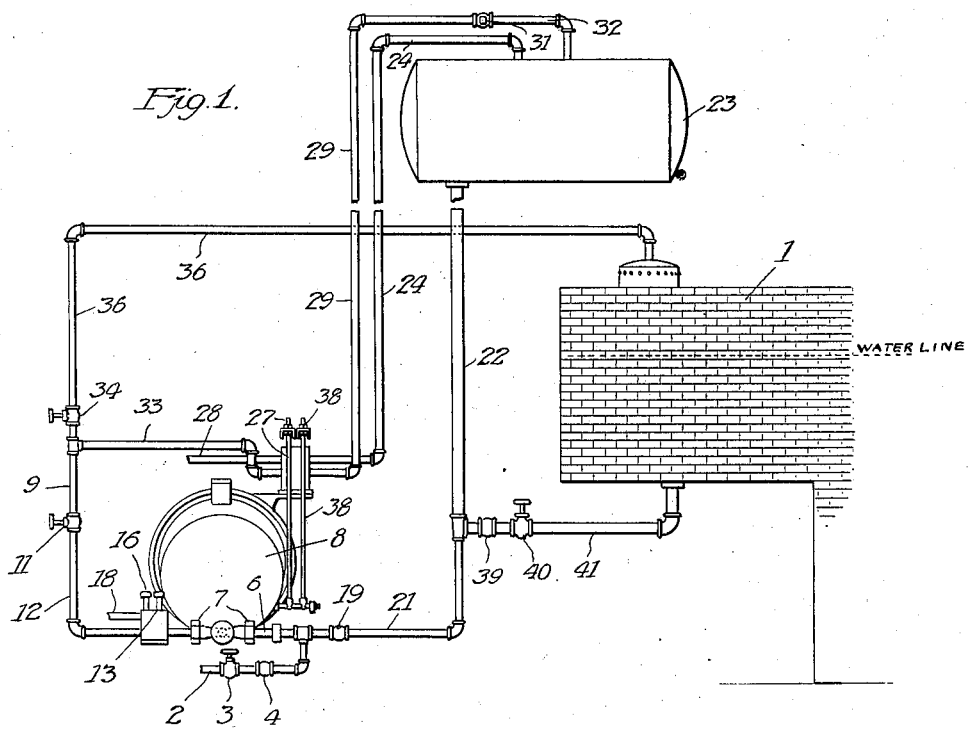
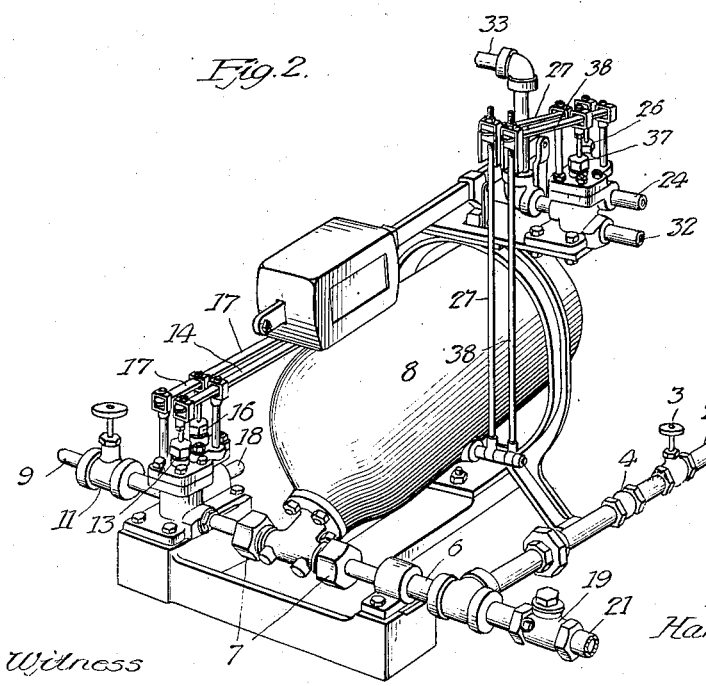
Inventor
Hans E. K. Pohl
By Wilson, Dowell, McCanna & Rehm
Attys.
Witness
R. B. Davison Patented Mar. 26, 1935

1,996,026

UNITED STATES PATENT OFFICE 1,996,026

BOILER FEED TRAP

Hans E. K. Pohl, River Forest, Ill., assignor to Crane Co., Chicago, Ill., a corporation of Illinois Application October 31, 1930, Serial No. 492,461

6 Claims. (Cl. 137—103)

This invention relates to systems for delivering fluids into receptacles under pressure and to such a system that is particularly well adapted to feeding water to a boiler. It is an object of this invention to provide a system particularly suited as a boiler feed system, which is positive in action, simple in construction and readily accessible for adjustment and repair.

It is also an object of this invention to eliminate all unnecessary apparatus and combine the required apparatus in such a way as to provide a compact positive feeding system, the essential parts of which may be located at an accessible point about the boiler being supplied thereby. In view of its applicability to a boiler feed water supply the invention will be described in this form.

In accordance with this invention the fluid is fed into a reservoir such as a tilting trap which has in conjunction therewith or under control thereof, a sufficient number of valves to permit the feeding of the fluid into the trap and from the trap into an auxiliary tank and from the tank into the boiler in certain cycles without the use of auxiliary traps or other feeding devices. By this invention all the working parts are actuated by the same mechanism and therefore may be made visible and accessible.

The trap is preferably arranged to receive water from any suitable source and to discharge the water by the action of the steam pressure of the boiler being fed, into an auxiliary tank from which the water may be drained into the boiler by gravity. The trap is arranged to control all the required valves and particularly those which will permit simultaneous filling of the trap and transfer of water from the tank to the boiler.

A better understanding of this invention will be had from the following description given in connection with the drawing in which:

Fig. 1 is a schematic diagram illustrating the boiler feed system constructed and connected in accordance with this invention.

Fig. 2 is a perspective of the trap and associated valves controlled thereby.

Referring more particularly to the drawing, the boiler which is to be supplied with feed water by a system involving this invention is indicated diagrammatically and is designated by the reference character 1. Feed water from any suitable source of supply (not shown) is connected to pipe 2 from which it passes through control valve 3, check valve 4, pipe 6 and trunnion 7, into a tilting trap 8 under certain conditions. The tilting trap may be placed at any desired level and is preferably placed in the most accessible position regardless of the water level in the boiler.

Steam is also admitted to the tilting trap 8 under certain conditions through a pipe 9, valve 11, pipe 12, and trunnion 7. The flow of steam being controlled by a valve 13 which is actuated by trap 8, through a lever system 14; a second valve 16, is also operated by the trap through a lever system 17. The latter valve controls a vent line 18 from the trap.

The trap discharges its water after a certain level therein is reached back through trunnions 7 into pipe 6 through check valve 19 and into pipe 21. Pipe 22 of relatively larger diameter than pipe 21, connects pipe 21 with an auxiliary gravity feed tank 23 disposed preferably six to ten feet above the water line of the boiler.

The auxiliary tank 23 is vented to the atmosphere during the periods when water is being transferred from trap 8 thereto through a pipe 24 which connects to a valve 26 operated by trap 8 through a lever system 27, the valve discharging into the atmosphere through a pipe 28.

Tank 23 is also subjected to the steam pressure of the boiler being filled at certain periods through a pipe 29, check valve 31 and pipe 32. Pipe 29 connects to a steam pipe 33 which joins pipe 9 and is connected to the boiler through a valve 34 and pipe 36. The flow through pipes 29 and 33 is controlled by a valve 37 also operated by trap 8 through a lever system 38.

The steam supply to the trap 8, through the pipe 9 obviously need not be taken from the boiler direct but can be taken from any source if desired, but the pressure must be sufficiently high to lift the water the required height, depending of course, upon the nature of the installation.

From the foregoing it will be seen that trap 8 actuates four valves which control the entry of steam into trap 8 and tank 23 and also control the venting of trap 8 and tank 23.

Tank 23 discharges its water into the boiler through riser 22, check valve 39, valve 40, and pipe 41. The water will flow from tank 23 into the boiler by gravity when the pressure in the tank and boiler is equalized through the operation of valves 26 and 27 by trap 8.

The operation of the foregoing system is as follows:

Feed water from any suitable source is led into a tilting trap 8 through pipe 2, valve 3, check valve 4, pipe 6 and trunnion 7. While being filled the trap is in its upper position in which position valve 16 is open thus venting the trap to atmosphere. Valve 13 at the same time is closed and prevents the entry of steam into the trap. Water may therefore flow into trap 8 until the latter is tilted into lower position by the weight of the water. The lowering of trap 8 closes valve 16 and therefore vent 18 and opens valve 13 admitting steam under pressure from the boiler into the trap. The steam forces the water from the trap through pipe 6, check valve 19, pipe 21 and pipe 22 into the auxiliary tank 23. During this period tank 23 is vented to the atmosphere through pipe 24 and valve 26, the latter being maintained open by the trap when in its lowered position. At the same period, valve 37 is maintained closed by the trap.

After the water has been forced out of trap 8 and into tank 23 the trap will resume its raised position thereby closing valve 13 to shut off steam from trap 8, opening valve 16 to vent trap 8, closing valve 26 to seal tank 23, and opening valve 37 to admit steam from the boiler through pipes 33 and 29, check valve 31 and pipe 32. The entry of steam through this latter connection to tank 23 will equalize the pressure in the tank and boiler. This will permit flow of water from tank 23 due to its static head or gravity into the boiler through riser 22, check valve 39 and valve 40 and pipe 41.

It will be apparent from the foregoing that while water is being drained from tank 23 into the boiler, water is also being fed into trap 8, the actions being simultaneous. Also the single riser 22 serves both to conduct water from trap 8 to tank 23 and at a different period in the cycle of operations from tank 23 to boiler 1.

As can be seen, particularly from Fig. 2, applicant's trap is constructed to independently operate four different valves each of which serves a particular function and each being operated in a certain timed relation to the other and all of which in combination make it possible for the operation of applicant's system. The four valves being actually mechanically operated from the trap are positioned adjacent the trap preferably in close proximity thereto. Due to the fact that all of the control valves for the system are operated from the single trap or first reservoir in the system, they may all be placed at a convenient accessible point regardless of the water level in the boiler. The only part of the system which necessarily need be placed at an inconvenient place is the auxiliary tank 23 which requires no attention whatever.

It is obvious that the trap 8 need not necessarily be disposed below the water level of the boiler but may be placed above the water line if there be a convenient accessible position available above the water level.

The importance of having independent lines for pipes and controls for the steam supply and vent to the auxiliary tank to insure positive, immediate, and silent operation may be further explained by assuming certain operating conditions. For example, let it be assumed that a charge of water has been delivered to tank 23 and the trap has returned to filling position. A certain elapse of time is required to establish equalization of pressures between tank 23 and the boiler especially when first starting the system and the water and system are cold and the latter contains condensate. Equalization must occur before the water in tank 23 can flow into the boiler 1 by gravity. During the period of equalization which is longer when the system is cold trap 8 may again be filled with water and tilt into discharging position a second time, delivering another charge to tank 23. The first charge still being present in tank 23 must be displaced by the second charge and will spill over through vent line 24. If it were not for this independent vent line the condensate and excess water would have to return through steam line 29, with the consequence that when the trap returned to filling position the steam line 29 would be water logged and the entire system would be blocked until the steam line 29 was cleared. It is, therefore, important that independent steam and vent lines be provided in order to maintain a dry steam line at all times. As a further assurance of dry steam the line 32 is preferably installed at a higher level than the vent line 24 and provided with a check valve 31.

It is obvious that many changes may be made in the piping and structural details without departing from the spirit and scope of this invention as defined in the claims appended hereto.

I claim:

1. In a feed water supply system, a tilting trap, a water supply pipe thereto, a vent line having a valve therein and connected to the trap for venting the same, a steam line having a valve therein connected thereto for admitting steam under pressure into said trap, operative connections between said trap and said valves whereby said valves are controlled by the position of said trap, an auxiliary tank, a water connection therefrom to said trap, a vent line having a valve therein and connected to said tank for venting the same, an independent steam line having a valve therein and connected to said tank for admitting steam under pressure into said tank, operative connections between said latter two valves and said trap whereby said latter two valves are controlled by the position of said trap, and a water discharge pipe from said tank.

2. In a feed water supply system, a tilting trap, a water supply pipe thereto, a vent line thereto having a valve therein secured to said trap and a steam line having a valve therein secured to said trap for admitting steam under pressure into said trap, operative connections between said trap and said valves whereby said valves are controlled by the position of said trap, an auxiliary tank, a water connection therefrom to said trap, a vent line having a valve therein secured to said trap and independent of the interior thereof and connected to said tank for venting the same, an independent steam line having a valve therein secured to said trap and independent of the interior thereof and connected to said tank for admitting steam under pressure into said tank, operative connections from said latter two valves to said trap whereby said latter two valves are controlled by the position of said trap, and a water discharge pipe from said tank, said water discharge pipe including in part said water connections.

3. In a boiler feed water supply system, the combination with a steam boiler, of a tilting trap, an auxiliary tank at a higher elevation than the water level of said boiler, connections having non-return check valves for supplying water to said trap and for feed of water from said trap to said tank and from said tank to said boiler, valve means and separate connections controlled thereby for alternately venting said trap and admitting steam from said boiler to said trap, operative connections between said valve means and trap whereby said valve means are controlled by the position of said trap, other valve means and separate connections controlled thereby for alternately venting said auxiliary tank and admitting steam from said boiler to said tank, and operative connections between said last mentioned valve means and the trap whereby the latter valve means are controlled by the position of the trap, said last mentioned connections operating said last mentioned valve means to vent the tank during admission of steam to said trap and to admit steam to the tank during the venting of the trap.

4. In a boiler feed water supply system, the combination with a steam boiler, of a tilting trap, an auxiliary tank at a higher elevation than the water level of said boiler, connections having non-return check valves for supplying water to said trap and for feed of water from said trap to said tank and from said tank to said boiler, valve means and separate connections controlled thereby for alternately venting and admitting steam to said trap, operative connections between said valve means and trap whereby said valve means are controlled by the position of said trap, other valve means and separate connections controlled thereby for alternately venting and admitting steam to said tank, and operative connections between said last mentioned valve means and the trap whereby the latter valve means are controlled by the position of the trap, said last mentioned connections operating said last mentioned valve means to vent the tank during admission of steam to said trap and to admit steam to the tank during the venting of the trap, said trap and all of said valve means and operating connections being disassociated from the auxiliary tank.

5. In a boiler feed water system, the combination with a steam boiler, of a tilting trap, an auxiliary tank at a higher elevation than the water level of said boiler, a water supply pipe having a non-return check valve connected with said trap, a pipe having a non-return check valve connecting said first mentioned pipe with said auxiliary tank, a pipe having a non-return check valve connecting said second mentioned pipe with the water space of said boiler, the connection between the second and third pipes being between the second mentioned check valve and the auxiliary tank, valve means and separate connections controlled thereby for alternately venting and admitting steam to said trap, operative connections between said valve means and trap whereby said valve means are controlled by the position of said trap, other valve means and separate connections controlled thereby for alternately venting and admitting steam to said tank, and operative connections between said last mentioned valve means and the trap whereby the latter valve means are controlled by the position of the trap, said last mentioned connections operating said last mentioned valve means to vent the tank during admission of steam to said trap and to admit steam to the tank during the venting of the trap.

6. In a boiler feed water system, the combination with a steam boiler, of a tilting trap, an auxiliary tank at a higher elevation than the water level of said boiler, a water supply pipe having a non-return check valve connected with said trap, a pipe having a non-return check valve connecting said first mentioned pipe with said auxiliary tank, a pipe having a non-return check valve connecting said second mentioned pipe with the water space of said boiler, the connection between the second and third pipes being between the second mentioned check valve and the auxiliary tank, said trap adapted to tilt downwardly in response to a predetermined filling and to tilt upwardly in response to a predetermined emptying, independent vent connections for said trap and said auxiliary tank, independent connections for supplying steam from said boiler to said trap and auxiliary tank, and automatic valve mechanism associated with said tilting trap and operative to one position by the downward tilting of the trap and to another position by the upward tilting of the trap, said valve means controlling the respective vent and steam connections for admitting steam to the trap and venting the auxiliary tank in said first mentioned position and for venting the trap and admitting steam to the auxiliary tank in said second mentioned position.

HANS E. K. POHL.